US006013887A

United States Patent [19]

Satake et al.

[11] Patent Number: 6,013,887

[45] Date of Patent: Jan. 11, 2000

[54] COLOR-SORTING MACHINE FOR GRANULAR MATERIALS

[75] Inventors: Satoru Satake, Tokyo; Takafumi Ito, Mihara, both of Japan

[73] Assignee: Satake Corporation, Tokyo, Japan

[21] Appl. No.: 09/056,364

[22] Filed: Apr. 7, 1998

[30] Foreign Application Priority Data

Apr. 22, 1997 [JP] Japan .................................... 9-120227

[51] Int. Cl.[7] ................................ B07C 5/342; G01J 3/50

[52] U.S. Cl. .......................... 209/581; 209/580; 209/587; 209/588; 209/639; 209/938; 250/226; 356/425

[58] Field of Search .................................... 209/580, 581, 209/587, 588, 638, 639, 938; 750/226, 224; 356/407, 406, 225

[56] References Cited

U.S. PATENT DOCUMENTS

| | | | |
|---|---|---|---|
| 5,487,472 | 1/1996 | Satake et al. | 209/581 |
| 5,638,961 | 6/1997 | Satake et al. | 209/580 |
| 5,773,058 | 7/1998 | Satake et al. | 209/581 |

FOREIGN PATENT DOCUMENTS

| | | |
|---|---|---|
| 3-63532 | 3/1991 | Japan . |
| 3-78634 | 4/1991 | Japan . |
| 8-229517 | 9/1996 | Japan . |

*Primary Examiner*—Donald P. Walsh
*Assistant Examiner*—Brett C. Martin
*Attorney, Agent, or Firm*—Darby & Darby

[57] ABSTRACT

A color-sorting machine for granular materials optically detects raw material grains falling along a substantially fixed path and sorts out no-good grains by color. An optical detection unit to this end comprises a condenser lens, a plurality of optical filters and a plurality of light-receiving sensors corresponding to the filters and can detect a plurality of wavelengths. The light-receiving sensors lie side by side on the same plane, are formed in a unit body, require no positioning adjustment among the light-receiving sensors, and make it possible to reduce the size of the optical system. A prism is provided between the condenser lens and the light-receiving sensors. The prism has light path diffraction surfaces of the same number as the light-receiving sensors, so that the light-receiving sensors receive light of the same point of view and can perform color sorting. Detected light partition plates are provided between adjacent light path diffraction surfaces of the prism and between the corresponding adjacent light-receiving sensors to improve the precision of optical detection.

5 Claims, 6 Drawing Sheets

COLOR-SORTING MACHINE FOR GRANULAR MATERIALS

BACKGROUND OF THE INVENTION

This invention relates to a machine for sorting cereal grain, plastic pellets, coffee beans and other granular materials, and more particularly to an improvement of a photoelectric detection device or optical detector in a color-sorting machine for granular materials.

The color-sorting machine for granular materials discussed here is of the type comprising a raw material supply device, a transport device that drops the raw material grains fed from the supply unit in a substantially fixed locus or path, an optical detection device provided along the raw material grain drop path for optically detecting the falling raw material grains, and a sorting device for removing no-good grains. The machine detects changes in the quantity of received light from no-good grains, namely colored grains and foreign matters such as glass, pebbles, etc., passing along the coming-down path, through the optical detection device, and operates the sorting device based on the value of the detection signal to sort the no-good grains out of the raw material grains by, for instance, blowing them away by means of air jet or the like.

There are optical detection devices known as this type, which illuminate the raw material grains with light, separate the reflected light into the respective wavelengths of red and green or red, green and blue, optically detect each wavelength by means of visible light sensors and discriminate grains with specific colors that make them no-good, based on the detection values obtained.

An example of such an optical detection device will be described with reference to FIG. 5. The optical detection device shown in the figure is provided with an optical detection unit 300 which comprises a condenser lens 350, a color separation prism 360, and two visible light sensors 330 and 330. The color separation prism 360 is adapted to separate the light reflected from the raw material grains G to be sorted into a red wavelength and a green wavelength and to lead one of the wavelengths, red for example, in a direction perpendicular to the other. The respective wavelengths separated by the prism 360 are incident to the visible light sensor 330 for detecting a red wavelength and the visible light sensor 330 for detecting a green wavelength, which are provided in their paths of progress, respectively, and are detected. Ratio computations, that is color analysis, is carried out on the values of the detected red wavelength and green wavelength, and when these values of the ratio computations are outside of prescribed threshold values, a jet nozzle unit operates and the bad particle of red color is sorted out. Such optical detection devices can be seen in, for example, Japanese Patent Application Laid-Open Publication Nos. 3-62532 and 3-78634.

Further, a granular sorting machine, which sorts out no-good grains, such as colored grains and inorganic impurities of pebbles and glass, from the material to be sorted by means of near infrared light and visible light, is seen in Japanese Patent Application Laid-Open Publication No. 8-229517. As shown in FIG. 6, this color-sorting machine for granular materials is such that the detected light is separated into two wavelengths of near infrared light and visible light by a dichroic mirror 310, and one of these wavelengths is led in a direction perpendicular to the other. The respective wavelengths thus divided are detected by the near infrared light sensor 340 and the visible light ray sensor 330 which are provided in the positions which they pass through. A jet nozzle unit operates according to comparison between the values detected by these sensors and standard values set in advance to sort out no-good grains.

Japanese Patent Application Laid-Open Publication No. 8-229517 also shows an optical detection unit 300 as shown in FIG. 7. This unit includes a sensor section 380 that has a visible light sensor 330 and a near infrared light sensor 340 formed integrally with the former. The optical detection unit 300 detects an optical detection position F1 on the upper side in the coming-down path of the material to be sorted by means of the visible light sensor 330, and an optical detection position F2 on the lower side in the coming-down path is detected by the near infrared light sensor 340.

The color-sorting machines for granular materials as shown in FIGS. 5 and 6, that carry out the detection of a wavelength in the near infrared range and a wavelength in visible range, or the detection of a red wavelength and a green wavelength or red, green and blue wavelengths by means of the single optical detector, split the light from the material being sorted into two or three wavelengths through the dichroic mirror or color separation prism described above, and lead them incident on the light sensors provided in the directions of travel of the respective wavelengths. With this kind of optical detection structure, two or three light-receiving sensors are arranged at right angles to each other around the dichroic mirror or color separation prism, so that the whole optical detection unit becomes large in size. Furthermore, it is necessary to make the light, which is detected from the same grain of the material to be sorted in the same position, incident on the respective sensors. As described above, however, the respective light-receiving sensors are arranged in the positions at right angles to each other, so that positioning of the respective sensors for making the detected light accurately incident to corresponding one of the two or three sensors is very difficult.

On the other hand, the light detection unit 300 shown in FIG. 7 that includes the sensor section 380 having the visible light sensor 330 and the near infrared light sensor 340 formed integrally can provide a solution to the problems of increased size and positioning described above. However, when the light-receiving sensors of the sensor section 380 are comprised of, for example, a visible light sensor for detecting a red wavelength and a visible light sensor for detecting a green wavelength and are used in so-called color sorting based on the respective wavelengths, color sorting cannot be done. The reason is that the red wavelength and the green wavelength are detected at the different light detection positions F1 and F2, respectively, and it is impossible to identify the light detected from F1 and F2 as a red wavelength and a green wavelength from the same grain.

SUMMARY OF THE INVENTION

The present invention, in view of the above problems, has an object of providing a color-sorting machine for granular materials equipped with a small optical detection device that can perform color sorting.

Another object of the invention is to provide a color-sorting machine for granular materials that can perform color sorting and remove no-good grains accurately.

To these ends, the invention aims at integrally forming a plurality of light-receiving sensors arranged side by side and at also integrally providing a plurality of optical paths from a condenser lens to the respective light-receiving sensors to thereby make the apparatus compact and optically detect the same grain in the same position with the plurality of sensors simultaneously.

According to the invention, there is provided a color-sorting machine for granular materials which comprises a device for supplying raw material grains, a transport device for dropping the raw material grains fed from the supply device in a substantially fixed locus or path, at least one optical detection device provided along the locus of fall of the raw material grains for optically detecting the falling raw material grains and for outputting detection signals, a sorting device for removing no-good grains from the falling raw material grains according to the output signal from the optical detection device, and a control device connected to the supply device, the optical detection device and the sorting device for controlling the operation. The optical detection device includes an optical detection unit which comprises a condenser lens for collecting light from the falling raw material grains, a plurality of optical filters for separating the light passing through the lens, and a plurality of light-receiving sensors corresponding to the filters, a background, and illumination units. The plurality of light-receiving sensors is formed in a unit body to be arranged side by side on the same plane. The optical detection device further comprises a prism positioned between the condenser lens and the light-receiving sensors. This prism has surfaces for diffracting the light path of the same number as the light-receiving sensors, so that the plurality of light-receiving sensors receives light of the same point of view.

In this color-sorting machine for granular materials, light from the same light detection position passes through the condenser lens, is separated by the optical filters and accurately made incident on the respective light-receiving sensors by means of the light path diffraction surfaces of the prism.

It is preferable for the plurality of optical filters to be attached side by side on the light-receiving surface of the prism. Further, the light path diffraction surfaces are preferably formed in a manner that the opposite side of the prism from the condenser lens is concave. With this configuration, the light passing through the prism is directed toward convergence, and the arrangement of the light-receiving sensors becomes more compact.

It is preferable that the optical detection unit has a partition plate between a boundary of adjacent light path diffraction surfaces of the prism and a boundary of corresponding adjacent light-receiving sensors. The partition plate separates a light path from a diffraction surface of the prism to a corresponding sensor from an adjacent light path, so that the optical detection value of each light-receiving sensor is not affected by light for any other light-receiving sensor and the optical detection precision is improved.

Preferably, the transport device is adapted to drop raw material grains in a band-like flow in which a plurality of raw material grains stand side by side laterally, and the sorting device comprises a jet nozzle unit with a plurality of air nozzles corresponding to the raw material grains in the belt-like flow, and each of the light-receiving sensors has light-receiving elements corresponding to the number of raw material grains in the belt-like flow and to the number of the air nozzles. No-good grains in the belt-like flow are detected by the light-receiving elements in corresponding positions and removed accurately and surely by the air nozzles in corresponding positions.

BRIEF DESCRIPTION OF THE DRAWINGS

The above and other features and advantages of the invention will be apparent from the explanations of embodiments that will be made below with reference to accompanying drawings, in which.

DESCRIPTION OF THE PREFERRED EMBODIMENTS

The preferred embodiments of the invention will be described with reference to FIGS. 1 to 4.

Figure 1A:
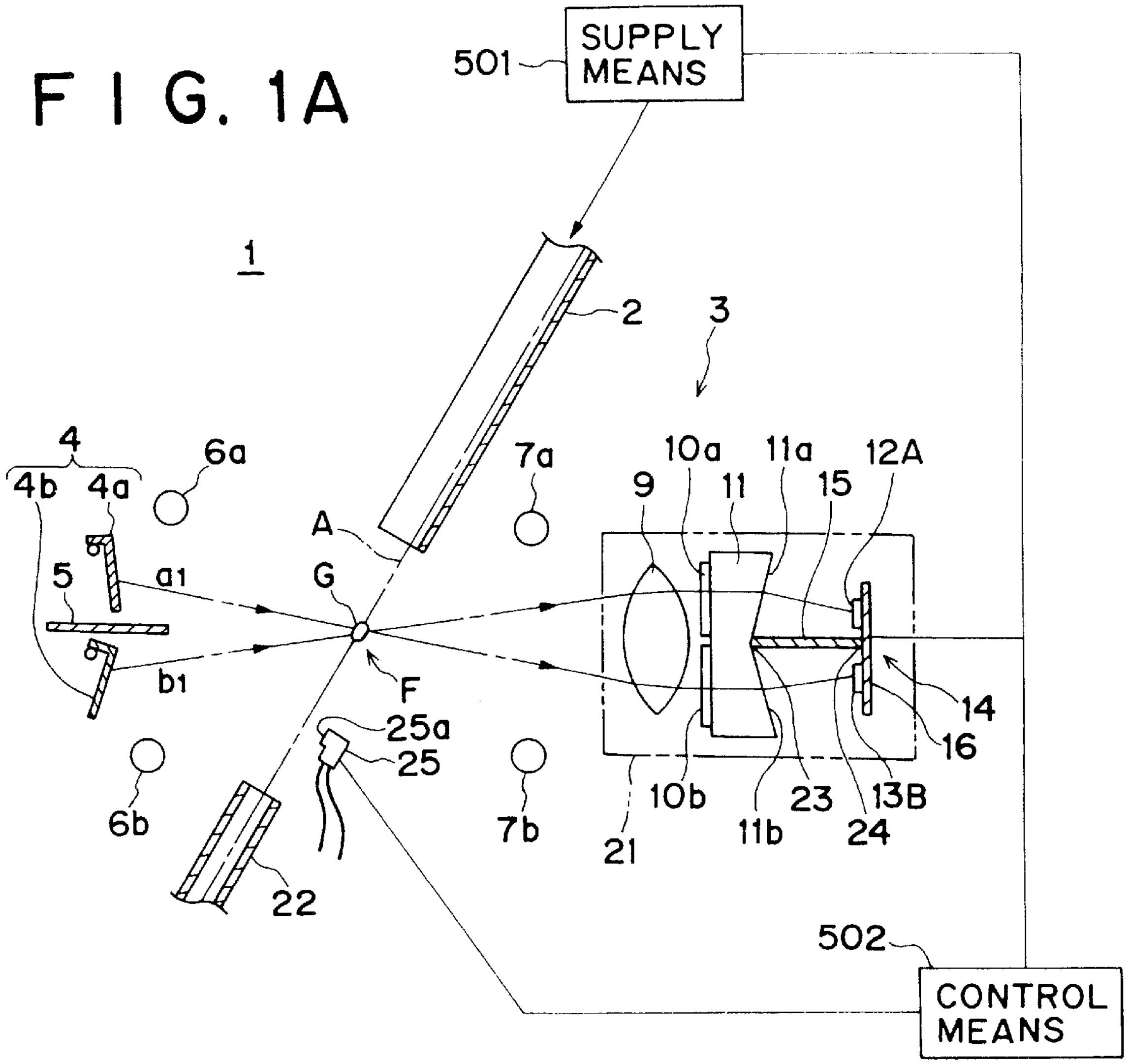
FIG. 1A is a schematic view that shows a color-sorting machine for granular materials according to the first embodiment of the invention, in particular an optical detection device thereof.
Figure 1B:
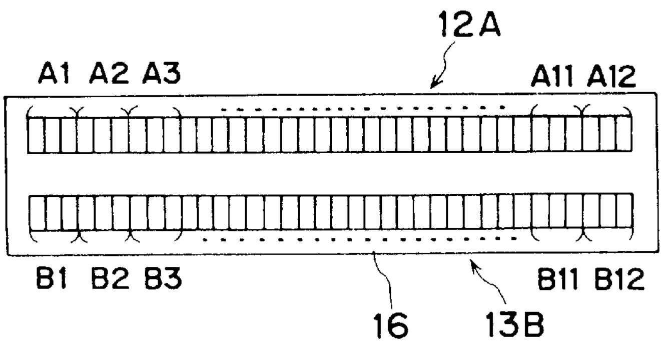
FIG. 1B is a plan view showing two light sensors in the device of FIG. 1.
Figure 1C:
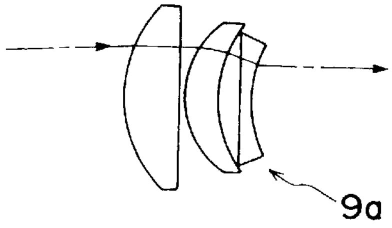
FIG. 1C is a schematic view showing a modification of a condenser lens in the device of FIG. 1.
Figure 2:
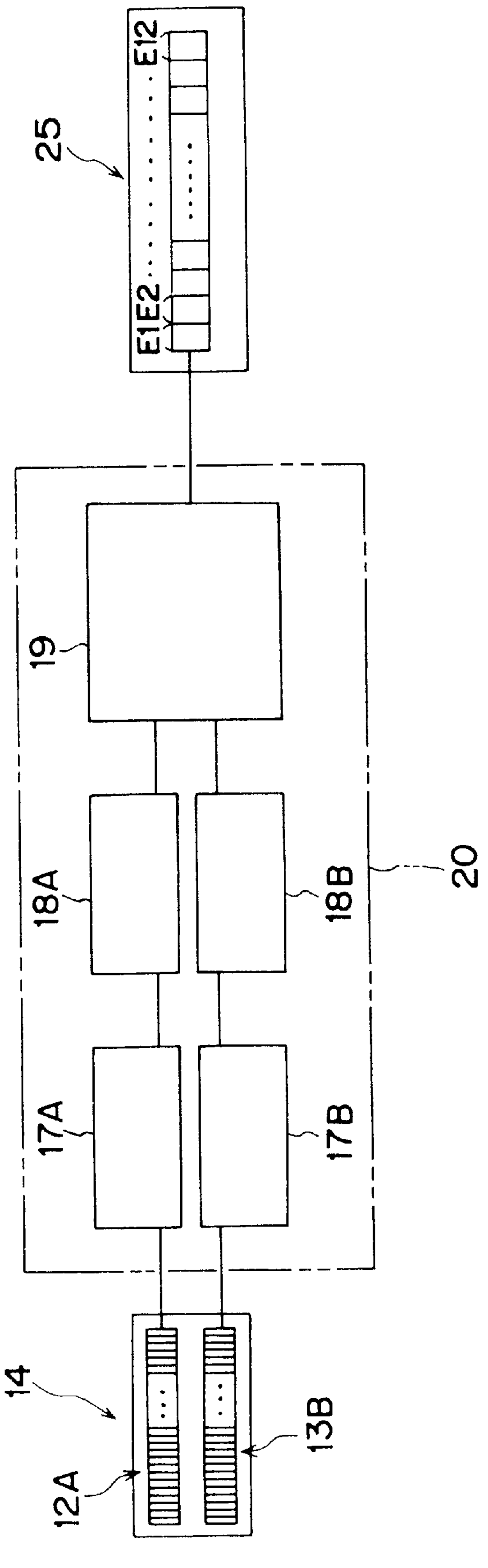
FIG. 2 is a schematic view showing a light-reception signal processing unit associated with the device of FIG. 1.

FIG. 1 and FIG. 2 show essential parts of the color-sorting machine for granular materials according to the first embodiment.

The color-sorting machine for granular materials is generally denoted by reference numeral 1 and comprises means 501 for supplying raw material grains, transport means for dropping the raw material grains G fed from the supply means in a substantially fixed locus or path, a device 3 for optically detecting the raw material grains G, means for sorting no-good grains, a pipe 22 for collecting good grains and means 502 connected to the raw material supplying means, the optical detection device 3 and the sorting means for controlling the operation.

The raw material supplying means 501 is, for example, a grain storage hopper and a feed valve or roller provided in a lower part thereof. The raw material transport means includes a trough-like chute 2 tilted so as to level the grains and drop the in a thin belt-like form. The sorting means comprises a jet nozzle unit 25 that is adapted to jet air from a plurality of nozzle openings 25*a*, only one shown in the figure. Further, the collection pipes 22 serves as means for receiving the falling grains and taking them out of the machine.

The optical detection device 3 is made up of two component part groups which are disposed across the coming-down or drop path A of fall of the raw material grains G from the chute 2 of the transport means at the end thereof.

The group on one side of the drop path A, the left side in the figure, includes a background 4 comprising a first reflector 4*a* and a second reflector 4*b*, a fluorescent lamp 6*a* and a halogen lamp 6*b*. The first reflector 4*a* and the second reflector 4*b* are separated, and are provided vertically. The fluorescent lamp 6*a* is disposed above the first reflector 4*a*, corresponding thereto, and the halogen lamp 6*b* is disposed below the second reflector 4_b_, corresponding thereto. A partition plate 5 is provided between the reflectors 4_a_ and 4_b_, and it prevents interference of light between the reflectors. The first reflector 4_a_ and the second reflector 4_b_ are adjustable in angle to direct light to the raw material grains G in a detection position F.

The group on the other side of the drop path A, the right side in the figure, includes a fluorescent lamp 7_a_, a halogen lamp 7_b_ and the optical detection unit 21. The optical detection unit 21 comprises a condenser lens 9, a first optical filter 10_a_, a second optical filter 10_b_, a prism 11 and a sensor section 14. The sensor section 14 has a near infrared sensor 12A and a visible light sensor 13B, which are arranged vertically and attached as a unit body. The condenser lens 9, the prism 11 and the sensor section 14 are lined up in this order from the near side to the far side of drop path A so as to receive light from the detection position F consecutively. The fluorescent lamp 7_a_ is disposed above the condenser lens 9, the halogen lamp 7_b_ is disposed below the condenser lens 9, and they function as illumination means.

The prism 11 has a cross-section with a drooping surface of incidence to which light (wavelength) is incident on the side of the light detection position, a pair of light path diffracting surfaces on the opposite side to the incidence surface and upper and lower surfaces connecting the incidence surface to each of the light path diffraction surfaces. The prism 11 is in a shape horizontally long with this cross-section, that is, the shape elongate in the direction perpendicular to the plane of the figure. Attached on the side of the incidence surface for light of the prism 11 are the first optical filter 10_a_ which only passes wavelengths in the near infrared range and the second optical filter 10_b_ which only passes wavelengths in the visible range. The filters 10_a_ and 10_b_ have a shape elongate along the incidence surface of the prism and are arranged vertically with the first optical filter 10_a_ being above the second optical filter 10_b_ being below in this embodiment.

On the opposite side from the incidence surfaces of the prism 11, that is, the side near the sensor section 14, light path diffracting surfaces 11_a_ and 11_b_, which determine the paths of the light separated into the near infrared range and the visible range are formed. The light path diffraction surface 11_a_ is inclined toward the lower left so as to direct light to the near infrared sensor 12A, and the light path diffracting surface 11_b_ is slant toward the lower right to direct light to the visible light sensor 13B. A detected light partition plate 15 is provided to extend from a boundary 23 between the light path diffracting surface 11_a_ and the light path diffracting surface 11_b_ to a boundary 24 between the near infrared sensor 12A and the visible light sensor 13B, and it separates the light in the visible range and that in the near infrared range, which are emitted from the respective light path diffraction surfaces.

Incidentally, even though the condenser lens 9 is a single unit part in this embodiment, it may comprises a lens group 9_a_ that suitably combines a plurality of concave and convex lenses as shown in FIG. 1C.

The sensor section 14 will be now described. The sensor section 14 has a band-like base material or a package 16, a near infrared sensor 12A and a visible light sensor 13B, which are attached on the package 16. The sensors 12A and 13A each extend in a strip manner along the package 16, respectively, and the near infrared sensor 12A is positioned above and the visible light sensor 13B is positioned below. However, the arrangement of the sensors 12A and 13B may be reverse to the above, along with the optical filters 10_a_ and 10_b_. In other words, the visible light sensor 13B may be positioned above and the near infrared sensor 12A positioned below.

The near infrared sensor 12A comprises sensor arrays A1–A12 arranged side by side in a row, each of which is formed by a set of three light-receiving elements. Likewise, the visible light sensor 13B comprises sensor arrays B1–B12 lined up horizontally, and each sensor array has three light-receiving elements arranged side by side in a set. The manner in which the near infrared sensors 12A and the visible light sensors 13B are arranged on the package 16 is that the sensor array B1 is located just below the corresponding sensor array A1, and likewise, the other sensor arrays A2–A12 correspond to the respective sensor arrays B-2–B12. See FIG. 1B.

The lengths of the optical filters 10_a_, 10_b_ and the prism 11, that is, the dimensions in the direction perpendicular to the plane of the figure, and the number of the sensor arrays A1–A12 and B1–B12 are set to approximately correspond to the total number of the raw material grains G which pass through the detection position F at the same time. In other words, the sensor arrays A1 and B1 correspond to a raw material grain at one edge of the belt-like flow passing through the detection position F, and the sensor arrays A12 and B12 correspond to a raw material grain at the opposite edge.

Referring now to FIG. 2, the near infrared sensor 12A and the visible sensor 13B are connected to a light-reception signal processing unit 20 of control means 502, and the jet nozzle unit 25 is electrically connected to the light-reception signal processing unit 20. The light-reception signal processing unit 20 comprises amplifiers 17A and 17B, comparison circuits 18A and 18B and an ejector operation circuit 19. The jet nozzle unit 25 has ejector valves E1–E12 respectively corresponding to the plurality of nozzle openings 25_a_, and the ejector valves E1–E12 are arranged side by side in a row as can be seen in the figure.

By the way, the structure of the color-sorting machine 1 for granular material, except the optical detection device which is the object of improvement by the present invention, and a related part the control means, may be the same as a conventional one, and for simplification, no further description of the raw material supplying means 501, the transport means 2 and the jet nozzle unit 25 will be made herein.

Subsequently, the color-sorting machine for granular materials according the second embodiment will be described with reference to FIGS. 3 and 4.

The machine of the second embodiment is a modification of the first embodiment. Here, component parts, which are similar to those of the first embodiment, will be given the same reference numerals, and the description will be omitted. The optical detection device 30 of this machine, similarly to the first embodiment, comprises two component part groups positioned with a coming-down or drop path A of raw material grains G from a chute 2 interposed therebetween.

On one side of the drop path A, the left side in the figure, there is a background 40 comprising first, second and third reflectors 40_a_, 40_b_ and 40_c_. The first, second and third reflectors 40_a_, 40_b_ and 40_c_ are individually separate and adjustable in angle. In addition, an illumination unit 80_a_ that emits red illuminating light is provided diagonally above the first reflector 40_a_, an illumination unit 80_b_ that emits green illuminating light diagonally above the second reflector 40_b_ and illumination unit 80_c_ that emits blue illuminating light diagonally above the third reflector 40_c_. Between the first and second reflectors and between the second and third reflectors, provided are partition plates 50a and 50b, such that the illuminating light for one reflector is not incident on another reflector.

On the other hand, on the opposite side of the drop path A, the right side in the diagram, there are a fluorescent lamp 70 and an optical detection unit 230. The optical detection unit 230 has a condenser lens 90, a prism 110 and a sensor section 120, lined up in order from the side near the drop path A. The fluorescent lamps 70 are disposed in respective positions above and below the condenser lens 90.

The sensor section 120 has the first, second and third visible light sensors 120a, 120b and 120c, and these sensors are arranged vertically and formed integrally. Further, the prism 110 is adapted to direct the detected light incident thereon through the condenser lens 90 from the light detection position F to the first, second and third visible light sensors 120a–120c.

More specifically, the prism 110 has a cross-sectional shape with a drooping surface of incidence that receives light (wavelengths) on the side of the light detection position, light path diffraction surfaces on the opposite side to the incidence surface and upper and lower flat surfaces connecting the incidence surface and the light path diffraction surfaces. The prism 110 is formed to be laterally elongate in a band-like manner with this cross-section. A first optical filter 100a that passes only blue light, a second optical filter 100b that passes only green light and a third optical filter 100c that passes only red light are attached vertically in this order onto the incidence surface of the prism 110. On the opposite side of the prism 100 from the incidence surface, or on the side close to the sensor section 120, light path diffraction surfaces 110a, 10b and 110c, which determine the paths of the light separated into blue, green and red by the optical filters 100a, 100b and 100c, are formed. The light path diffraction surface 110a is inclined to the lower left and the light path diffraction surface 110c is inclined to the lower right, and the light path diffraction surface 110b forms a curve that joins the inclined surfaces.

A detected light partition plate 150a is provided between a boundary 110d between the light path diffraction surface 110a and the light diffraction surface 110b and a boundary 120d between the visual light sensor 120a and the visual light sensor 120b. Likewise, a detected light partition plate 150b is provided between a boundary 110e between the light path diffraction surface 110b and the light path diffraction surface 110c and a boundary 120e between the visual light sensor 120b and the visual light sensor 120c. The detected light partition plates 150a and 150b separate the blue, green and red light radiating from the light path diffraction surfaces 110a, 10b and 110c.

The first, second and third visual light sensors 120a–120c each have a plurality of sensor arrays arranged side by side laterally, and each sensor array is made up of a plurality of light-receiving elements. Each of the sensor arrays of the first, second and third visual light sensors 120a–120c is arranged, similarly to those of the first embodiment, in a package so as to correspond the other sensor arrays.

Figure 4:
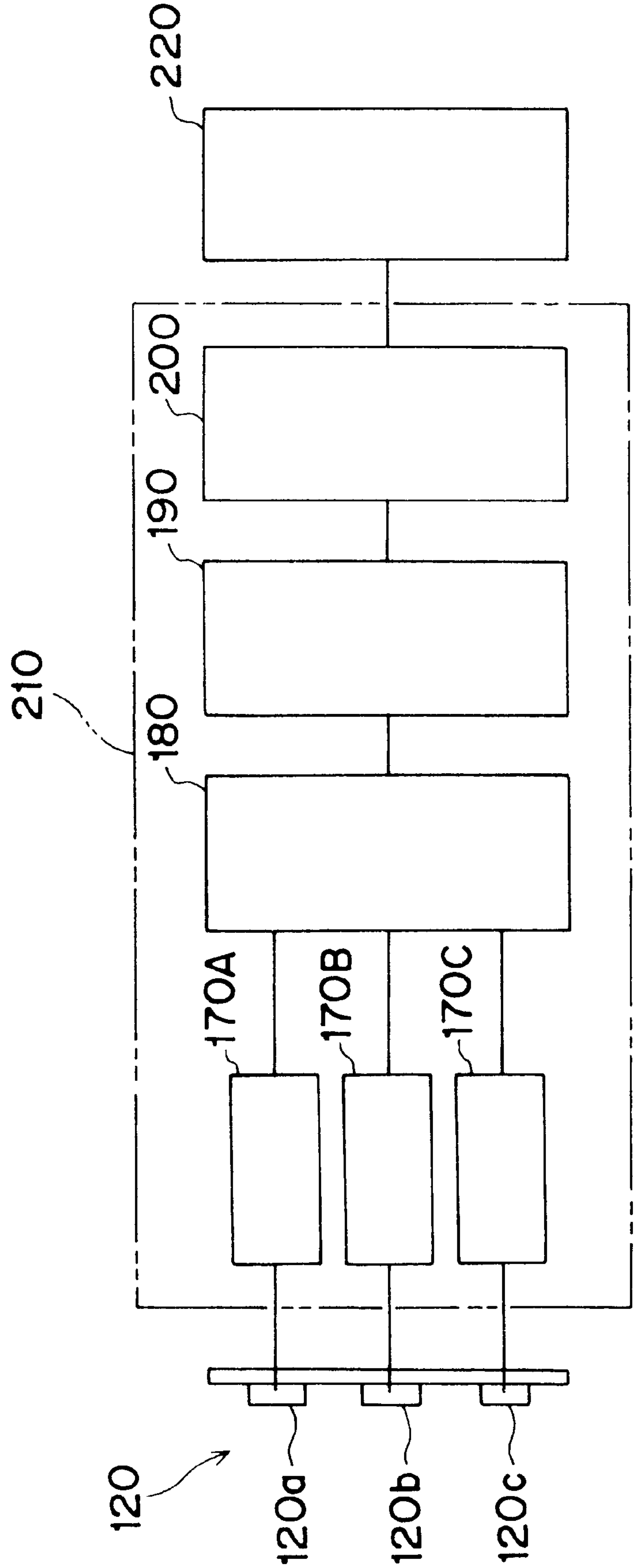
FIG. 4 is a schematic view showing a light-reception signal processing unit associated with the device of FIG. 3.
Figure 5:
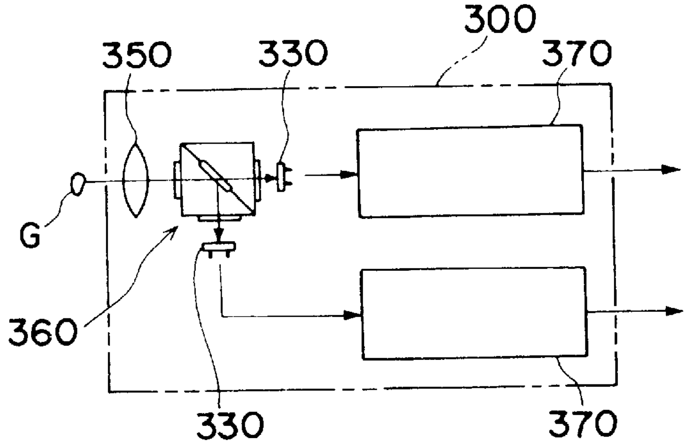
FIG. 5 PRIOR ART
FIG. 5 is a diagram showing an optical detection device in a conventional color-sorting machine for granular materials.
Figure 6:
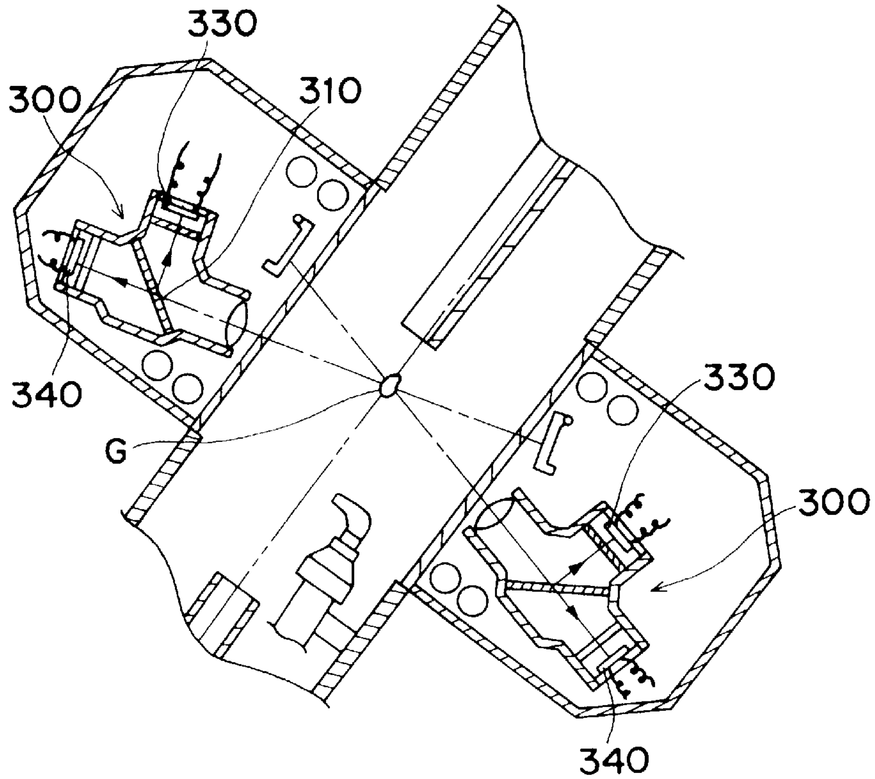
FIG. 6 PRIOR ART
FIG. 6 is a view showing an optical detection device in another conventional color-sorting machine for granular materials.
Figure 7:
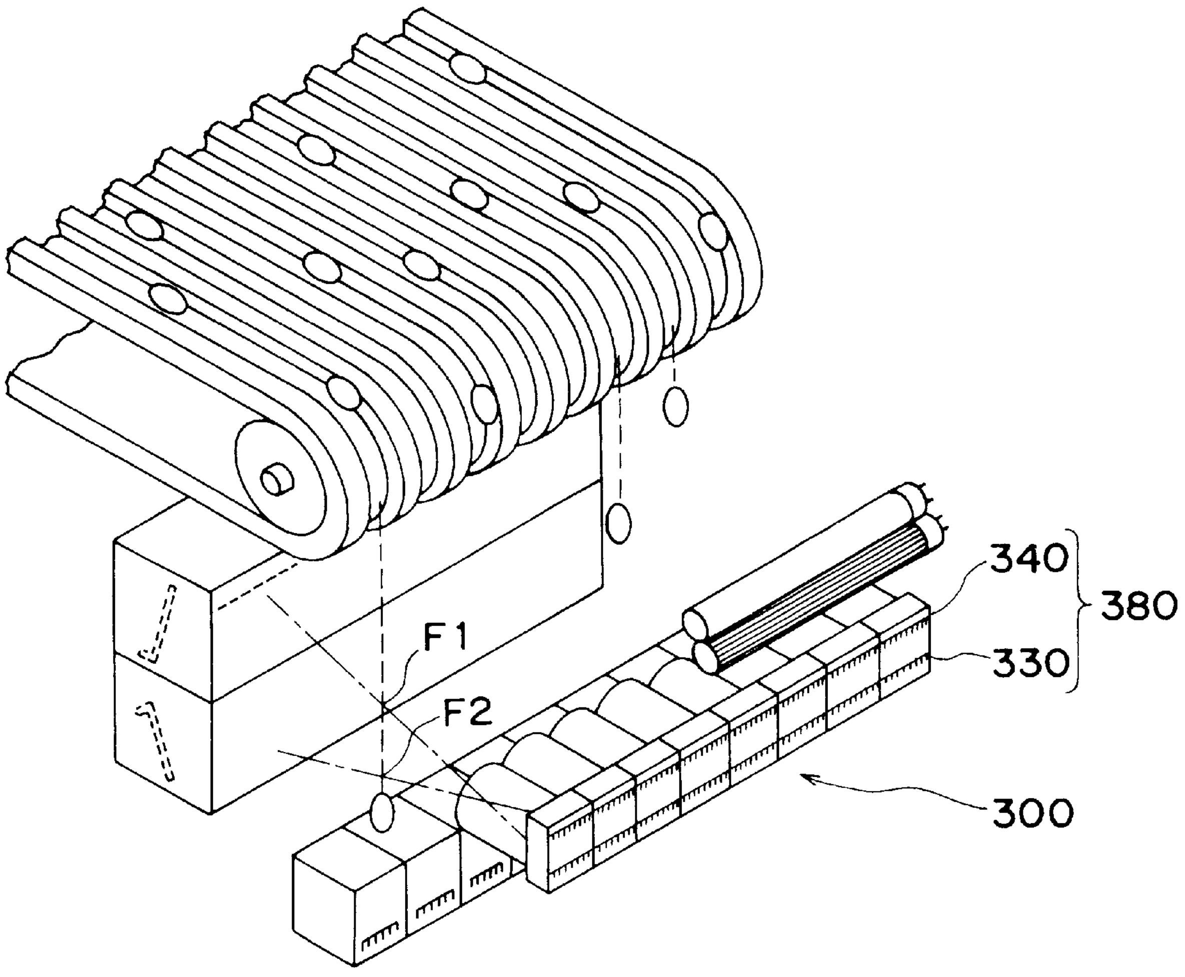
FIG. 7 PRIOR ART
FIG. 7 is a view showing an optical detection device in still another conventional color-sorting machine for granular materials.

As is shown in FIG. 4, the sensor section 120 is connected to a light-reception signal processing unit 210 of control means 512. The light-reception signal processing unit 210 comprises amplifiers 170A, 170B and 170C, a ratio computation circuit 180, a comparison circuit 190 and an ejector operation circuit 200. The ejector operation circuit 200 is connected a jet nozzle unit 220.

The operation of the machines of the first and second embodiments will be now described.

First, referring to FIGS. 1 and 2 again, description will be made on the first embodiment. The raw material grains G fed from the raw material supplying means 501 slide down the chute 2, and are released from the transport end of the chute 2 in the approximately straight coming-down or drop locus or path A.

During the operation, in the optical detection device 3, illumination light of the halogen lamp 6b is blocked by the partition plate 5 from being incident on the first reflector 4a, and is incident on the second reflector 4b alone to be reflected as background light b1. The background light b1 passes through the light detection position F and is incident on the condenser lens 9, and then on the first optical filter 10a. The first optical filter 10a allows only the light in the near infrared range, wavelengths of 1,400–1,600 nm, to pass therethrough. This background light b1 in the near infrared range is incident on the prism 11, is changed its optical path by the light path diffraction surface 11a, and is incident to the near infrared sensor 12A. Likewise, illumination light from the fluorescent lamp 6a is blocked by the partition plate 5 from being incident on the second reflector 4b, and it is incident on the first reflector 4a alone to be reflected as background light a1. The background light a1 passes through the light detection position F and is incident to the condenser lens 9, and only the light in the visible range, wavelengths of 420–490 nm, passes through the second optical filter 10b and is incident to the prism 11. This light is changed in is optical path by the light path diffraction surface 11b and is incident on the visible light sensor 13B.

At this time, the detected light partition plate 15 separates the light radiating from each of the light path diffraction surfaces not to allow the light to enter the light-receiving sensor other than its corresponding sensor.

When the raw material grains G that have left the chute 2 come to the light detection position F in the drop path A while being illuminated by the fluorescent lamp 7a and the halogen lamp 7b, they reflect light from the fluorescent lamp 7a and the halogen lamp 7b. The reflected light passes through the condenser lens 9 and is incident on the first and second optical filters 10a and 10b, and it is separated into the visible light range and the near infrared range. The reflected light in the visible light range is changed in its optical path though the light path diffraction surface 11b of the prism 11 and is incident to the visible light sensor 13B. In addition, the reflected light in the near infrared range is also changed in optical path through the optical path diffraction surface 11a of the prism 11 and is incident on the near infrared sensor 12A.

The detected value signal from the near infrared sensor 12A is sent to the amplifier 17A, and after amplification, it is sent to the comparison circuit 18A. The comparison circuit 18A compares the amplified detected value signal with a threshold voltage stored in advance. If the detected value comes out of the threshold value, the comparison circuit 18A sends a signal to the ejector operation circuit 19, and the jet nozzle unit 25 is operated.

The value detected by visual light sensor 13B is also sent to the amplifier 17B in the same way, and after amplification, it is sent to the comparison circuit 18B. The comparison circuit 18B compares the amplified detected value signal with a threshold voltage stored in advance. When the detected value misses the threshold value, the comparison circuit 18B sends a signal to the ejector operation circuit 19 to operate the jet nozzle unit 25. In this embodiment, the detection of no-good grains is carried out by determining whether the difference between the amount of light reflected from the raw material grains G and the amount of background light is out of or within the fixed threshold values. However, this detection may be made by means of the difference between the quantity of light passing through the raw material grains G and the amount of background light.

The ejector valves E1–E12 of the jet nozzle unit 25 operate in correspondence to the sensor arrays A1–A12 of the near infrared sensor 12A and to the sensor array B1–B12 of the visual light sensor 13B. That is, for example, if the detected value from the sensor array A1 is out of the preset threshold value at the comparison circuit 18A, the ejector valve El is operated by the ejector operation circuit 19. Likewise, the sensor arrays A1–A12 and B1–B12 correspond to the ejector valves E1–E12 in such a manner that the ejector valve E3 corresponds to the sensor array B3 and the ejector valve E5 corresponds to the sensor array A5.

As described above, the sensor arrays A1–A12 and B1–B12 correspond not only to each other vertically, but also to the raw material grains at the detection position F and further to the ejector valves E1–El2 of the jet nozzle unit 25. Thus, the light detected from the light detection position F will be incident on corresponding sensor arrays, for example, A1 and B1, and A2 and B2, without being incident on non-corresponding sensor arrays, such as A1 and B2, and A2 and B1. Accordingly, no-good grains such as foreign matters and colored grains are sorted out reliably by corresponding sensor arrays and ejectors.

Figure 3:
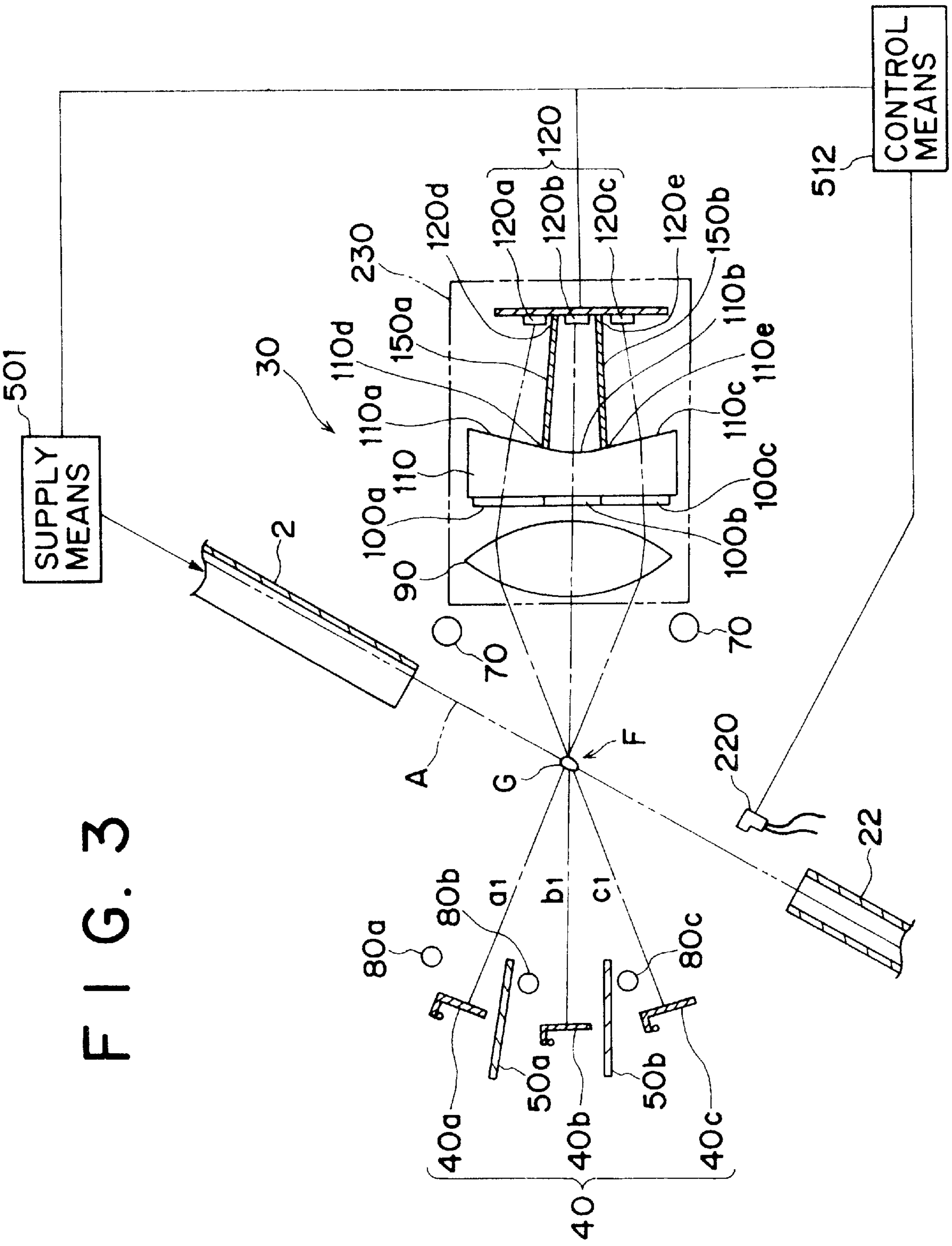
FIG. 3 is a schematic view showing a color-sorting machine for granular materials according to the second embodiment of the invention, in particular an optical detection device thereof.

Description will be now made on the second embodiment with reference to FIGS. 3 and 4. The operation of the machine of the second embodiment is almost the same as that of the first embodiment, and only the parts that are different will be described.

During the operation, red illumination light of the illumination unit 80*a* is blocked by the partition plate 50*a* and strikes only the first reflector 40*a*, and it is reflected as background light a1, passing through the light detection position F. The background light a1 passes through the condenser lens 90 and the third optical filter 100*c*, is incident on the prism 110 where the light path is changed by the light path diffraction surface 110*c* of the prism 110, and is incident to the third visible light sensor 120*c*. At this time, the background light a1 emitted from the light path diffraction surface 110*c* is separated by the detected light partition plate 150*b* so that it has no effect on the second visible light sensor 120*b*, and it enters the third visible light sensor 120*c*. The green and blue illumination lights of the illumination units 80*b* and 80*c* are reflected in the same manner by the second and third reflectors 40*b* and 40*c*, respectively, and as background lights b1 and c1, they pass through the light detection position F, the condenser lens 90, the second and first optical filters 100*b*, 100*c* and the light path diffraction surfaces 110*b*, 110*a* of the prism 110, and are incident to the second and first visible light sensors 120*b*, 120*a*.

On the other hand, illumination light from the fluorescent lamp 70 strikes the raw material grains G and is reflected. The reflected light passes through the condenser lens 90, the first, second and third optical filters 100*a*, 100*b* and 100*c* and the light path diffraction surfaces 110*a*, 110*b* and 110*c* of the prism 110, and it is incident to the corresponding first, second and third visible light sensors 120*a*, 120*b* and 120*c*.

The first, second and third visible light sensors 120*a*, 120*b* and 120*c* detect the red, green and blue wavelengths from the optical detection light consisting of the incident background light a1, b1 and c1 and the light reflected from the raw material grains G. The detection values are amplified by the amplifiers 170A, 170B and 170C, connected to the respective sensors, and sent to the ratio computing circuit 180. The ratio computing circuit 180 performs ratio computation based on the respective detected values, and the ratio computed is input to the comparison circuit 190. The comparison circuit 190 compares the ratio value to threshold voltage ratio values determined in advance which correspond to specific colors. If the ratio value is out of the threshold values, the comparison circuit 190 sends an ejector operation signal to the ejector operation circuit 200. Then the jet nozzle unit 220 is operated by the ejector operation circuit 200 and colored grains to be sorted or no-good grains are sorted. Also in this second embodiment, as described on the first embodiment, the optical detection light to be compared with the threshold values may be based on the background light and the light passing through the raw material grains G.

Also in this embodiment, the respective sensor arrays of the three visible light sensors are arranged while corresponding to one another vertically, and the detected light from the same light detection position F is incident on corresponding sensor arrays of the three sensors. Thus, ratio computation can be accurately carried out from the detected values of the sensor arrays correctly corresponding to the grains to be detected, and it is possible to sort out the grains of objective or target colors.

The color-sorting machine for granular materials of the invention is not limited to the above embodiments, and various changes are possible within the scope of the appended claims. Although not illustrated, a plurality of optical sensors may be provided, the sensors of the same kind may be arranged in a plural number, and illumination units and optical filters may be of the types depending on the respective sensors. It is possible, for instance, to provide two visible light sensors for carrying out color sorting, or to provide two visible light sensors, for red and green wavelengths for example, and one near infrared sensor for performing color sorting and sorting of inorganic materials. Further, although the examples of providing a set of optical detection device have been described above, it goes without saying that two sets can be incorporated for optical detection of the front and back of raw material grains.

As having described above, in the optical detection unit of the color-sorting machines for granular materials according to the invention, the condenser lens, the optical filters and the plurality of light-receiving sensors attached on the same plane are arranged in this order, the prism having the light path diffraction surfaces of the same number as the light-receiving sensors are provided between the condenser lens and the light-receiving sensors, and the plurality of light-receiving sensors receive light at the same point of view. Thus, light from the same light detection position passes through the condenser lens and is separated by the optical filters, and each light (wavelength) is made incident to the corresponding light-receiving sensor through the light path diffraction surface of the prism. Thus, the invention, because of employing the compact sensor section with the plurality of light-receiving sensors arranged side by side and formed in a unit body for detecting different wavelengths, and since the corresponding light is accurately incident to each light-receiving sensor by means of the light path diffraction surfaces of the prism, can make the optical detection device compact as compared with the above mentioned dichroic mirror or color separation prism system in which the light-receiving sensors are at right angles to each other.

Further, in the optical detector of the invention, since the light-receiving sensors are arranged side by side, the sensor section or unit can be easily configured to match parts of one sensor with corresponding parts of the other sensors, and it is possible to apply the light of a predetermined wavelength to corresponding portions of the plurality of light-receiving sensors, even without individually adjusting the positions of the respective light-receiving sensors as required in the conventional technology. Furthermore, with the conventional optical detection unit having a plurality of light-receiving sensors formed integrally, each visible light sensor has a different light detection position, and therefore, it is impossible to identify the same raw material grain from the detected light and perform color sorting. According to the present invention, the light from the same light detection position is separated through the optical filters corresponding to the respective visible light sensors and then is incident on the corresponding visible light sensors through the light path diffraction surfaces of the prism. Accordingly, color sorting can be done through the ratio computation or color analysis based on the respective detected lights. For example, by providing two visible light sensors and one near infrared sensor and by setting optical filters and light path diffraction surfaces in accordance with these light-receiving sensors, color sorting and sorting of foreign matters such as pebbles and glass can be carried out with the single compact optical detection unit. Thus, light-receiving sensors can be combined variously.

What is claimed is:

1. A color-sorting machine for granular materials comprising: means for supplying raw material grains; transport means for dropping the raw material grains fed from the supplying said supplying means in a substantially fixed path; at least one optical detection device for optically detecting the falling raw material grains and outputting detection signals, said optical detection device comprising an optical detection unit provided along the drop path of the raw material grains, a background, and illumination units, said optical detection unit comprising a condenser lens for collecting light from the falling raw material grains, a plurality of optical filters for separating the light passing through said lens, a plurality of light-receiving sensors corresponding to said filters and a prism disposed between said condenser lens and said light-receiving sensors, said light-receiving sensors being formed in a unit body to lie side by side on the same plane, said prism having light path diffraction surfaces of the same number as said light-receiving sensors so that said light-receiving sensors receive light of the same point of view; sorting means for removing no-good grains from the falling raw material grains in response to the output signal from said optical detection device; and control means connected to said supplying means, said optical detection device and said sorting means for control operation.

2. The color-sorting machine for granular materials according to claim 1, wherein said plurality of optical filters are attached side by side to a light receiving surface of said prism.

3. The color-sorting machine for granular materials according to claim 1, wherein said light path diffraction surfaces are formed on an opposite side of said prism from said condenser lens in a manner that the opposite side of said prism is concave.

4. The color-sorting machine for granular materials according to claim 1, wherein said optical detection unit has partition plates each of which is provided between a boundary between adjacent light path diffraction surfaces of said prism and a boundary between corresponding adjacent light-receiving sensors.

5. The color-sorting machine for granular materials according to claim 1, wherein said transport means is so constructed as to drop the raw material grains in a belt-like flow in which a plurality of raw material grains are arranged side by side laterally, said sorting means comprises a jet nozzle unit equipped with a plurality of air nozzles corresponding to the raw material grains in the belt-like flow, and each of said light-receiving sensors has light-receiving elements corresponding to a number of the raw material grains in the belt-like flow and to a number of said air nozzles.

* * * * *